US006947477B2

(12) United States Patent
Struhsaker et al.

(10) Patent No.: US 6,947,477 B2
(45) Date of Patent: Sep. 20, 2005

(54) APPARATUS AND METHOD FOR CREATING SIGNAL AND PROFILES AT A RECEIVING STATION

(75) Inventors: Paul F. Struhsaker, Plano, TX (US); Russell C. McKown, Richardson, TX (US)

(73) Assignee: Raze Technologies, Inc., Plano, TX (US)

(*) Notice: Subject to any disclaimer, the term of this patent is extended or adjusted under 35 U.S.C. 154(b) by 801 days.

(21) Appl. No.: 09/839,719

(22) Filed: Apr. 20, 2001

(65) Prior Publication Data

US 2002/0097685 A1 Jul. 25, 2002

Related U.S. Application Data

(60) Provisional application No. 60/262,827, filed on Jan. 19, 2001, provisional application No. 60/262,712, filed on Jan. 19, 2001, provisional application No. 60/262,825, filed on Jan. 19, 2001, provisional application No. 60/262,698, filed on Jan. 19, 2001, provisional application No. 60/262,826, filed on Jan. 19, 2001, provisional application No. 60/262,951, filed on Jan. 19, 2001, provisional application No. 60/262,824, filed on Jan. 19, 2001, provisional application No. 60/263,101, filed on Jan. 19, 2001, provisional application No. 60/263,097, filed on Jan. 19, 2001, provisional application No. 60/273,579, filed on Mar. 5, 2001, provisional application No. 60/262,955, filed on Jan. 19, 2001, provisional application No. 60/262,708, filed on Jan. 19, 2001, provisional application No. 60/273,689, filed on Mar. 5, 2001, provisional application No. 60/273,757, filed on Mar. 5, 2001, provisional application No. 60/270,378, filed on Feb. 21, 2001, provisional application No. 60/270,385, filed on Feb. 21, 2001, and provisional application No. 60/270,430, filed on Feb. 21, 2001.

(51) Int. Cl.[7] .............................. H04B 1/38; H04L 5/16

(52) U.S. Cl. ........................................ 375/222; 375/224
(58) Field of Search .......................... 375/222; 370/314, 370/321, 347

(56) References Cited

U.S. PATENT DOCUMENTS

| 5,793,753 | A  |   | 8/1998  | Hershey et al.            |
|-----------|----|---|---------|---------------------------|
| 5,832,365 | A  | * | 11/1998 | Chen et al. ......... 455/15 |
| 5,978,650 | A  |   | 11/1999 | Fischer et al. ....... 455/3.1 |
| 6,222,858 | B1 | * | 4/2001  | Counterman ........ 370/474 |
| 6,230,326 | B1 | * | 5/2001  | Unger et al. ........ 725/111 |
| 6,320,903 | B1 | * | 11/2001 | Isaksson et al. ..... 375/232 |
| 6,345,071 | B1 | * | 2/2002  | Hamdi ............... 375/222 |
| 6,590,872 | B1 | * | 7/2003  | Shiue et al. ......... 370/314 |
| 6,636,490 | B1 | * | 10/2003 | Johnson ............. 370/328 |
| 6,654,384 | B1 | * | 11/2003 | Reza et al. ......... 370/469 |
| 2003/0002495 | A1 | * | 1/2003 | Shahar et al. ....... 370/389 |

FOREIGN PATENT DOCUMENTS

| EP | 0 800 285 A2  | 10/1997 |
|----|---------------|---------|
| WO | WO 96/34481   | 10/1996 |
| WO | WO 99/31837   | 6/1999  |

* cited by examiner

*Primary Examiner*—Stephen Chin
*Assistant Examiner*—Harry Vartanian

(57) ABSTRACT

Apparatus, and an associated method, for creating a profile associated with burst data signals communicated to a base station of a fixed wireless access communication system. The profile is created to facilitate receive operations performed upon subsequent bursts of the burst data signal. The profile is stored at a storage device and retrieved when subsequent bursts of the bursts data signal are received at the base station.

20 Claims, 5 Drawing Sheets

APPARATUS AND METHOD FOR CREATING SIGNAL AND PROFILES AT A RECEIVING STATION

CROSS-REFERENCE TO RELATED APPLICATIONS

The present invention claims priority to U.S. Provisional Application Ser. No. 60/262,827 filed Jan. 19, 2001.

The present invention is related to those disclosed in the following United States Provisional and Non-Provisional Patent Applications:

1) Ser. No. 09/713,684, filed on Nov. 15, 2000, entitled "SUBSCRIBER INTEGRATED ACCESS DEVICE FOR USE IN WIRELESS AND WIRELINE ACCESS SYSTEMS";
2) Ser. No. 09/838,810, filed Apr. 20, 2001, entitled "WIRELESS COMMUNICATION SYSTEM USING BLOCK FILTERING AND FAST EQUALIZATION-DEMODULATION AND METHOD OF OPERATION";
3) Ser. No. 09/839,726, filed Apr. 20, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";
4) Ser. No. 09/839,729, filed Apr. 20, 2001, entitled "APPARATUS AND METHOD FOR OPERATING A SUBSCRIBER INTERFACE IN A FIXED WIRELESS SYSTEM";
5) Ser. No. 09/838,910, filed Apr. 20, 2001, entitled "SYSTEM AND METHOD FOR INTERFACE BETWEEN A SUBSCRIBER MODEM AND SUBSCRIBER PREMISES INTERFACES";
6) Ser. No. 09/839,509, filed Apr. 20, 2001, entitled "BACKPLANE ARCHITECTURE FOR USE IN WIRELESS AND WIRELINE ACCESS SYSTEMS";
7) Ser. No. 09/839,514, filed Apr. 20, 2001, entitled "SYSTEM AND METHOD FOR ON-LINE INSERTION OF LINE REPLACEABLE UNITS IN WIRELESS AND WIRELINE ACCESS SYSTEMS";
8) Ser. No. 09/839,512, filed Apr. 20, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";
9) Ser. No. 09/839,259, filed Apr. 20, 2001, entitled "REDUNDANT TELECOMMUNICATION SYSTEM USING MEMORY EQUALIZATION APPARATUS AND METHOD OF OPERATION";
10) Ser. No. 09/839,457, filed Apr. 20, 2001, entitled "WIRELESS ACCESS SYSTEM FOR ALLOCATING AND SYNCHRONIZING UPLINK AND DOWNLINK OF TDD FRAMES AND METHOD OF OPERATION";
11) Ser. No. 09/839,075, filed Apr. 20, 2001, entitled "TDD FDD AIR INTERFACE";
12) Ser. No. 09/839,499, filed Apr. 20, 2001, entitled "APPARATUS, AND AN ASSOCIATED METHOD, FOR PROVIDING WLAN SERVICE IN A FIXED WIRELESS ACCESS COMMUNICATION SYSTEM";
13) Ser. No. 09/839,458, filed Apr. 20, 2001, entitled "WIRELESS ACCESS SYSTEM USING MULTIPLE MODULATION";
14) Ser. No. 09/839,456, filed Apr. 20, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";
15) Ser. No. 09/838,924, filed Apr. 20, 2001, entitled "APPARATUS FOR ESTABLISHING A PRIORITY CALL IN A FIXED WIRELESS ACCESS COMMUNICATION SYSTEM";
16) Ser. No. 09/839,727, filed Apr. 20, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM";
17) Ser. No. 09/839,734, filed Apr. 20, 2001, entitled "METHOD FOR ESTABLISHING A PRIORITY CALL IN A FIXED WIRELESS ACCESS COMMUNICATION SYSTEM";
18) Ser. No. 09/839,513, filed Apr. 20, 2001, entitled "SYSTEM AND METHOD FOR PROVIDING AN IMPROVED COMMON CONTROL BUS FOR USE IN ON-LINE INSERTION OF LINE REPLACEABLE UNITS IN WIRELESS AND WIRELINE ACCESS SYSTEMS";
19) Ser. No. 60/262,712, filed on Jan. 19, 2001, entitled "WIRELESS COMMUNICATION SYSTEM USING BLOCK FILTERING AND FAST EQUALIZATION-DEMODULATION AND METHOD OF OPERATION";
20) Ser. No. 60/262,825, filed on Jan. 19, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";
21) Ser. No.60/262,698, filed on Jan. 19, 2001, entitled "APPARATUS AND METHOD FOR OPERATING A SUBSCRIBER INTERFACE IN A FIXED WIRELESS SYSTEM";
22) Ser. No. 60/262,826, filed on Jan. 19, 2001, entitled "SYSTEM AND METHOD FOR INTERFACE BETWEEN A SUBSCRIBER MODEM AND SUBSCRIBER PREMISES INTERFACES";
23) Ser. No. 60/262,951, filed on Jan. 19, 2001, entitled "BACKPLANE ARCHITECTURE FOR USE IN WIRELESS AND WIRELINE ACCESS SYSTEMS";
24) Ser. No. 60/262,824, filed on Jan. 19, 2001, entitled "SYSTEM AND METHOD FOR ON-LINE INSERTION OF LINE REPLACEABLE UNITS IN WIRELESS AND WIRELINE ACCESS SYSTEMS";
25) Ser. No. 60/263,101, filed on Jan. 19, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";
26) Ser. No. 60/263,097, filed on Jan. 19, 2001, entitled "REDUNDANT TELECOMMUNICATION SYSTEM USING MEMORY EQUALIZATION APPARATUS AND METHOD OF OPERATION";
27) Ser. No. 60/273,579, filed Mar. 5, 2001, entitled "WIRELESS ACCESS SYSTEM FOR ALLOCATING AND SYNCHRONIZING UPLINK AND DOWNLINK OF TDD FRAMES AND METHOD OF OPERATION";
28) Ser. No. 60/262,955, filed Jan. 19, 2001, entitled "TDD FDD AIR INTERFACE";
29) Ser. No. 60/262,708, filed on Jan. 19, 2001, entitled "APPARATUS, AND AN ASSOCIATED METHOD, FOR PROVIDING WLAN SERVICE IN A FIXED WIRELESS ACCESS COMMUNICATION SYSTEM";
30) Ser. No. 60/273,689, filed Mar. 5, 2001, entitled "WIRELESS ACCESS SYSTEM USING MULTIPLE MODULATION";
31) Ser. No. 60/273,757, filed Mar. 5, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";

32) Ser. No. 60/270,378, filed Feb. 21, 2001, entitled "APPARATUS FOR ESTABLISHING A PRIORITY CALL IN A FIXED WIRELESS ACCESS COMMUNICATION SYSTEM";

33) Ser. No. 60/270,385, filed Feb. 21, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM";

34) Ser. No. 60/270,430, filed Feb. 21, 2001, entitled "METHOD FOR ESTABLISHING A PRIORITY CALL IN A FIXED WIRELESS ACCESS COMMUNICATION SYSTEM".

The above applications are commonly assigned to the assignee of the present invention. The disclosures of these related patent applications are hereby incorporated by reference for all purposes as if fully set forth herein.

TECHNICAL FIELD OF THE INVENTION

The present invention relates generally to a manner by which to operate upon burst data signals received at a receiving station, such as a base station of a fixed wireless access (FWA) communication system. More particularly, the present invention relates to apparatus, and an associated method, by which to create a profile representative of expected signal characteristics of a burst data signal and of expected characteristics of the channel upon which the burst data signal is communicated. The profile is used at the receiving station to facilitate processing of the burst data signals received at the receiving station.

BACKGROUND OF THE INVENTION

Telecommunications access systems provide for voice, data, and multimedia transport and control between the central office (CO) of the telecommunications service provider and the subscriber (customer) premises. Prior to the mid-1970s, the subscriber was provided phone lines (e.g., voice frequency (VF) pairs) directly from the Class 5 switching equipment located in the central office of the telephone company. In the late 1970s, digital loop carrier (DLC) equipment was added to the telecommunications access architecture. The DLC equipment provided an analog phone interface, voice CODEC, digital data multiplexing, transmission interface, and control and alarm remotely from the central office to cabinets located within business and residential locations for approximately 100 to 2000 phone line interfaces. This distributed access architecture greatly reduced line lengths to the subscriber and resulted in significant savings in both wire installation and maintenance. The reduced line lengths also improved communication performance on the line provided to the subscriber.

By the late 1980s, the limitations of data modem connections over voice frequency (VF) pairs were becoming obvious to both subscribers and telecommunications service providers. ISDN (Integrated Services Digital Network) was introduced to provide universal 128 kbps service in the access network. The subscriber interface is based on 64 kbps digitization of the VF pair for digital multiplexing into high speed digital transmission streams (e.g., T1/T3 lines in North America, E1/E3 lines in Europe). ISDN was a logical extension of the digital network that had evolved throughout the 1980s. The rollout of ISDN in Europe was highly successful. However, the rollout in the United States was not successful, due in part to artificially high tariff costs which greatly inhibited the acceptance of ISDN.

More recently, the explosion of the Internet and deregulation of the telecommunications industry have brought about a broadband revolution characterized by greatly increased demands for both voice and data services and greatly reduced costs due to technological innovation and intense competition in the telecommunications marketplace. To meet these demands, high speed DSL (digital subscriber line) modems and cable modems have been developed and introduced. The DLC architecture was extended to provide remote distributed deployment at the neighborhood cabinet level using DSL access multiplexer (DSLAM) equipment. The increased data rates provided to the subscriber resulted in upgrade DLC/DSLAM transmission interfaces from T1/E1 interfaces (1.5/2.0 Mbps) to high speed DS3 and OC3 interfaces. In a similar fashion, the entire telecommunications network backbone has undergone and is undergoing continuous upgrade to wideband optical transmission and switching equipment.

Similarly, wireless access systems have been developed and deployed to provide broadband access to both commercial and residential subscriber premises. Initially, the market for wireless access systems was driven by rural radiotelephony deployed solely to meet the universal service requirements imposed by government (i.e., the local telephone company is required to serve all subscribers regardless of the cost to install service). The cost of providing a wired connection to a small percentage of rural subscribers was high enough to justify the development and expense of small-capacity wireless local loop (WLL) systems.

Deregulation of the local telephone market in the United States (e.g., Telecommunications Act of 1996) and in other countries shifted the focus of fixed wireless access (FWA) systems deployment from rural access to competitive local access in more urbanized areas. In addition, the age and inaccessibility of much of the older wired telephone infrastructure makes FWA systems a cost-effective alternative to installing new, wired infrastructure. Also, it is more economically feasible to install FWA systems in developing countries where the market penetration is limited (i.e., the number and density of users who can afford to pay for services is limited to small percent of the population) and the rollout of wired infrastructure cannot be performed profitably. In either case, broad acceptance of FWA systems requires that the voice and data quality of FWA systems must meet or exceed the performance of wired infrastructure.

Wireless access systems must address a number of unique operational and technical issues including:

1) Relatively high bit error rates (BER) compared to wire line or optical systems; and 2) Transparent operation with network protocols and protocol time constraints for the following protocols:
   a) ATM;
   b) Class 5 switch interfaces (domestic GR-303 and international V5.2);
   c) TCP/IP with quality-of-service QoS for voice over IP (VoIP) (i.e., RTP) and other H.323 media services;
   d) Distribution of synchronization of network time out to the subscribers;

3) Increased use of voice, video and/or media compression and concentration of active traffic over the air interface to conserve bandwidth;

4) Switching and routing within the access system to distribute signals from the central office to multiple remote cell sites containing multiple cell sectors and one or more frequencies of operation per sector; and 5) Remote support and debugging of the subscriber equipment, including remote software upgrade and provisioning.

Unlike physical optical or wire systems that operate at bit error rates (BER) of $10^{-11}$, wireless access systems have time varying channels that typically provide bit error rates of $10^{-3}$ to $10^{-6}$. The wireless physical (PHY) layer interface and the media access control (MAC) layer interface must provide modulation, error correction and ARQ protocol that can detect and, where required, correct or retransmit corrupted data so that the interfaces at the network and at the subscriber site operate at wire line bit error rates.

The wide range of equipment and technology capable of providing either wireline (i.e., cable, DSL, optical) broadband access or wireless broadband access has allowed service providers to match the needs of a subscriber with a suitable broadband access solution. However, in many areas, the cost of cable modem or DSL service is high. Additionally, data rates may be slow or coverage incomplete due to line lengths. In these areas and in areas where the high cost of replacing old telephone equipment or the low density of subscribers makes it economically unfeasible to introduce either DSL or cable modem broadband access, fixed wireless broadband systems offer a viable alternative. Fixed wireless broadband systems use a group of transceiver base stations to cover a region in the same manner as the base stations of a cellular phone system. The base stations of a fixed wireless broadband system transmit forward channel (i.e., downstream) signals in directed beams to fixed location antennas attached to the residences or offices of subscribers. The base stations also receive reverse channel (i.e., upstream) signals transmitted by the broadband access equipment of the subscriber.

Unfortunately, the diversity of broadband access technology has resulted in a lack of standardization in the broadband access equipment. Cable modems and DSL routers are incompatible with each other and with fiber optic equipment. Different service providers locate broadband access equipment in different locations on the subscriber premises. Often this equipment is located inside the office or residence of the subscriber, which makes it inaccessible to maintenance workers unless the subscriber is present to admit the workers to the premises. The lack of standardization of broadband access equipment and the frequent inaccessibility of such equipment adds to the cost and complexity of broadband access.

Therefore, there is a need in the art for broadband access equipment that can be readily and inexpensively deployed in the large domestic and international markets that are not currently served by wired or wireless broadband access technology. Further, there is a need for an apparatus to compensate for distortion introduced upon data signals transmitted on a wireless communication channel.

Additionally, the base stations of a FWA system must be able to quickly and accurately to operate upon data bursts received from a potentially large number of subscribers.

Any manner by which to facilitate an increase in speed and accuracy by which the data bursts can be operated upon by the base stations, or other infrastructure, would therefore be advantageous.

SUMMARY OF THE INVENTION

The present invention provides apparatus and an associated method by which to operate upon bursts data signals received at a receiving station, such as a base station of a fixed wireless access communication system.

Through operation of an embodiment of the present invention, an increase in the speed and accuracy by which bursts of burst data signals are operated upon, when received at the receiving station, is possible.

Characteristics of data bursts and the channels by which the data bursts are received are stored in memory as signal and channel profiles at the receiving station. The profiles are updated, as appropriate, and include the information required by the demodulators (typically the demodulators are contained in radio frequency (RF) modems and demodulators and modems will be referred to interchangeably hereinafter) to permit their operation to demodulate bursts of data received by the demodulators.

The profiles further selectably include other parameters, such as the modulation index of the data signals communicated by the subscriber stations to the base station, the modulation orthogonalizations of the bursts of data signals of the bursts of data signals, parameters associated with FEC (forward error correction) of the data bursts sent to the base station by the subscriber stations, antenna combining parameters when antenna diversity and/or beamforming is utilized, timing adjustment parameters, as well as other values.

When a burst of data is provided to a demodulator, a profile associated with the channel upon which the burst is communicated to the base station and utilized in the demodulation of the burst of data. As the burst of data is demodulated, the values of the profile associated with the channel upon which the data burst is communicated are updated as appropriate. The updated profile is stored to be retrieved thereafter, when subsequent data bursts are received at the base station and demodulated at a demodulator thereof.

During operation of an embodiment of the present invention, data signals are processed at a receiving station, such as a base station in a fixed wireless access communication system. The data signals are transmitted to the receiving stations by any of a plurality of subscriber stations. Improved uplink capacity of data signals sent by the subscriber stations to the base station is possible as a result of operation of an embodiment of the present invention. Additionally, better compensation is made to counteract the effects of distortion of the data signals communicated during operation of a communication system in which an embodiment of the present invention is implemented.

Elements of the profile created and stored during operation of an embodiment of the present invention are selected, e.g., to be values pertinent to the implementation of the communication system. Upgrades, or other changes in the operation of the communication system, are readily implemented, as necessary, thereby to adapt operation of an embodiment of the present invention corresponding to the changes in operation of the communication system.

In one implementation, an embodiment of the present invention is implemented at the base station of a fixed wireless access communication system. Data bursts of data signals are communicated to the base station. The data bursts are generated by a plurality of subscriber stations positioned within the coverage area defined by the base station. Alternating ones of the bursts are provided to a pair of modems forming part of the receive portion of the base station. The modems are controlled by a controller, such as a base station central processing unit (CPU), to control demodulation operations thereat. The controller maintains profiles associated with the channels wherein separate ones of the data bursts are communicated. The profiles are retrieved and values of the elements of such profiles are utilized in the demodulation of the respective data bursts.

In these and other aspects, therefore, profile-creating apparatus and an associated method, is provided for creating at least a first profile associated with at least a first channel.

At least a first burst data signal is transmitted in bursts upon the at least the first channel to a receiving station. A profile parameter determiner is coupled to receive an indication of an initial burst of the first burst data signal transmitted upon the first channel to the receiving station. The profile parameter determiner determines a value of at least one parameter representative of communication of the burst data signal to the receiving station. A profile parameter storage device is coupled to the profile parameter determiner. The profile parameter storage device stores values representative of the at least one parameter determined by the profile parameter determiner. The values stored at the profile parameter storage device are used to facilitate receive operations performed at the receiving station of subsequent bursts of the first burst data signal.

The present invention will be better understood when read in light of the accompanying drawings which are described in the detailed description hereinbelow and in light of the claims appended hereto.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged subscriber integrated access device.

Figure 1:
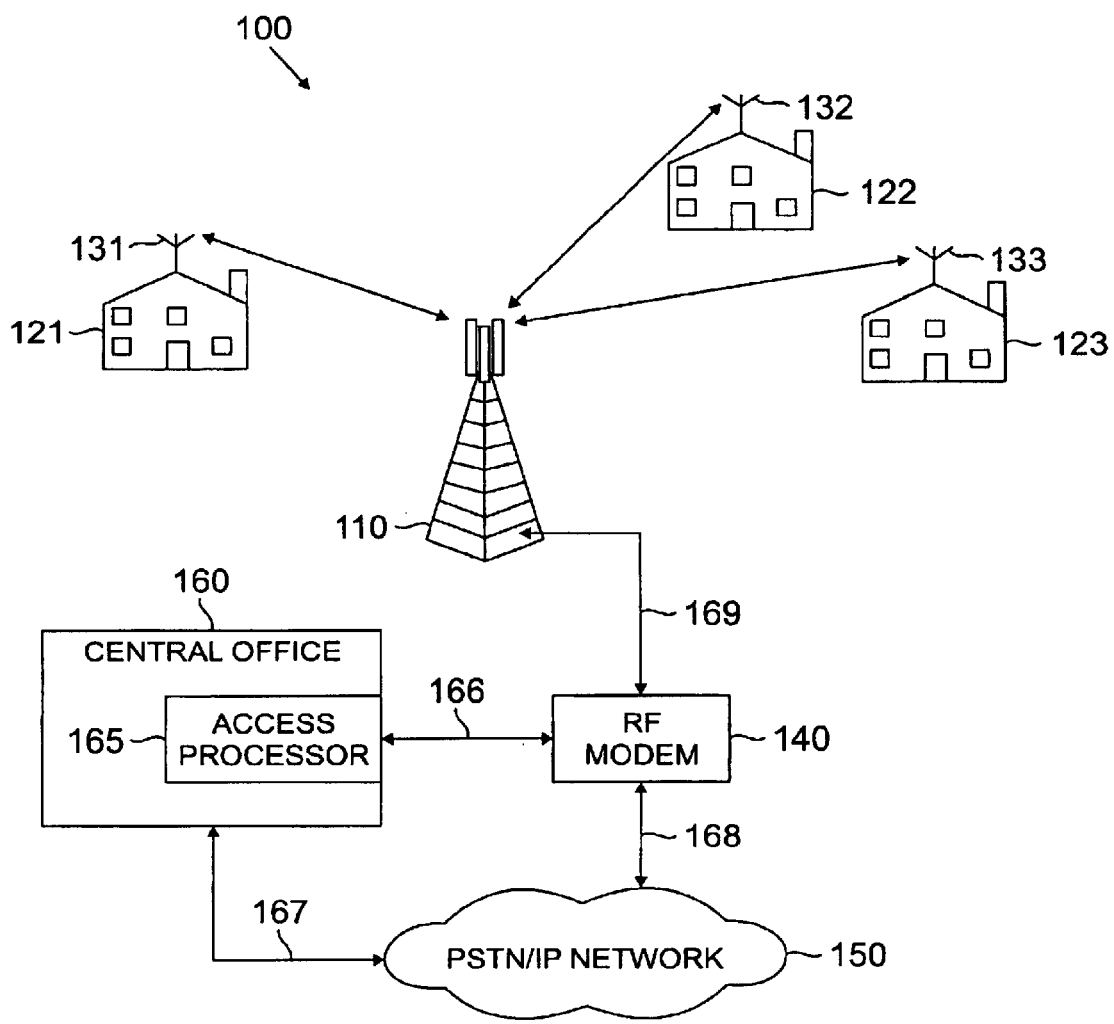
FIG. 1 illustrates a functional representation an exemplary fixed wireless access network according to an embodiment of the present invention.

FIG. 1 illustrates exemplary fixed wireless access network 100 according to one embodiment of the present invention. Fixed wireless network 100 comprises a plurality of transceiver base stations, including exemplary transceiver base station 110, that transmit forward channel (i.e., downlink or downstream) broadband signals to a plurality of subscriber premises, including exemplary subscriber premises 121, 122 and 123, and receive reverse channel (i.e., uplink or upstream) broadband signals from the plurality of subscriber premises. Subscriber premises 121–123 transmit and receive via fixed, externally-mounted antennas 131–133, respectively. Subscriber premises 121–123 may comprise many different types of residential and commercial buildings, including single family homes, multi-tenant offices, small business enterprises (SBE), medium business enterprises (MBE), and so-called "SOHO" (small office/home office) premises.

The transceiver base stations, including transceiver base station 110, receive the forward channel (i.e., downlink) signals from external network 150 and transmit the reverse channel (i.e., uplink) signals to external network 150. External network 150 may be, for example, the public switched telephone network (PSTN) or one or more data networks, including the Internet or proprietary Internet protocol (IP) wide area networks (WANs) and local area networks (LANS). Exemplary transceiver base station 110 is coupled to RF modem shelf 140, which, among other things, up-converts baseband data traffic received from external network 150 to RF signals transmitted in the forward channel to subscriber premises 121–123. RF modem shelf 140 also down-converts RF signals received in the reverse channel from subscriber premises 121–123 to baseband data traffic that is transmitted to external network 150.

RF modem shelf 140 comprises a plurality of RF modems capable of modulating (i.e., up-converting) the baseband data traffic and demodulating (i.e., down-converting) the reverse channel RF signals. In an exemplary embodiment of the present invention, each of the transceiver base stations covers a cell site area that is divided into a plurality of sectors. In an advantageous embodiment of the present invention, each of the RF modems in RF modem shelf 140 may be assigned to modulate and demodulate signals in a particular sector of each cell site. By way of example, the cell site associated with transceiver base station 110 may be partitioned into six sectors and RF modem shelf 140 may comprise six primary RF modems (and, optionally, a seventh spare RF modem), each of which is assigned to one of the six sectors in the cell site of transceiver base station 110. In another advantageous embodiment of the present invention, each RF modem in RF modem shelf 140 comprises two or more RF modem transceivers which may be assigned to at least one of the sectors in the cell site. For example, the cell site associated with transceiver base station 110 may be partitioned into six sectors and RF modem shelf 140 may comprise twelve RF transceivers that are assigned in pairs to each one of the six sectors. The RF modems in each RF modem pair may alternate modulating and demodulating the downlink and uplink signals in each sector.

RF modem shelf 140 is located proximate transceiver base station 110 in order to minimize RF losses in communication line 169. RF modem shelf 140 may receive the baseband data traffic from external network 150 and transmit the baseband data traffic to external network 150 via a number of different paths. In one embodiment of the present invention, RF modem shelf 140 may transmit baseband data traffic to, and receive baseband data traffic from, external network 150 through central office facility 160 via communication lines 166 and 167. In such an embodiment, communication line 167 may be a link in a publicly owned or privately owned backhaul network. In another embodiment of the present invention, RF modem shelf 140 may transmit baseband data traffic to, and receive baseband data traffic from, external network 150 directly via communication line 168 thereby bypassing central office facility 160.

Central office facility 160 comprises access processor shelf 165. Access processor shelf 165 provides a termination of data traffic for one or more RF modem shelves, such as RF modem shelf 140. Access processor shelf 165 also provides termination to the network switched circuit interfaces and/or data packet interfaces of external network 150. One of the principal functions of access processor shelf 165 is to concentrate data traffic as the data traffic is received from external network 150 and is transferred to RF modem shelf 140. Access processor shelf 165 provides data and traffic processing of the physical layer interfaces, protocol conversion, protocol management, and programmable voice and data compression.

It should be noted that network 100 was chosen as a fixed wireless network only for the purposes of simplicity and clarity in explaining a subscriber integrated access device according to the principles of the present invention. The choice of a fixed wireless network should not be construed in any manner that limits the scope of the present invention in any way. As will be explained below in greater detail, in alternate embodiments of the present invention, a subscriber integrated access device according to the principles of the present invention may be implemented in other types of broadband access systems, including wireline systems (i.e, digital subscriber line (DSL), cable modem, fiber optic, and the like) in which a wireline connected to the subscriber integrated access device carries forward and reverse channel signals.

Figure 2:
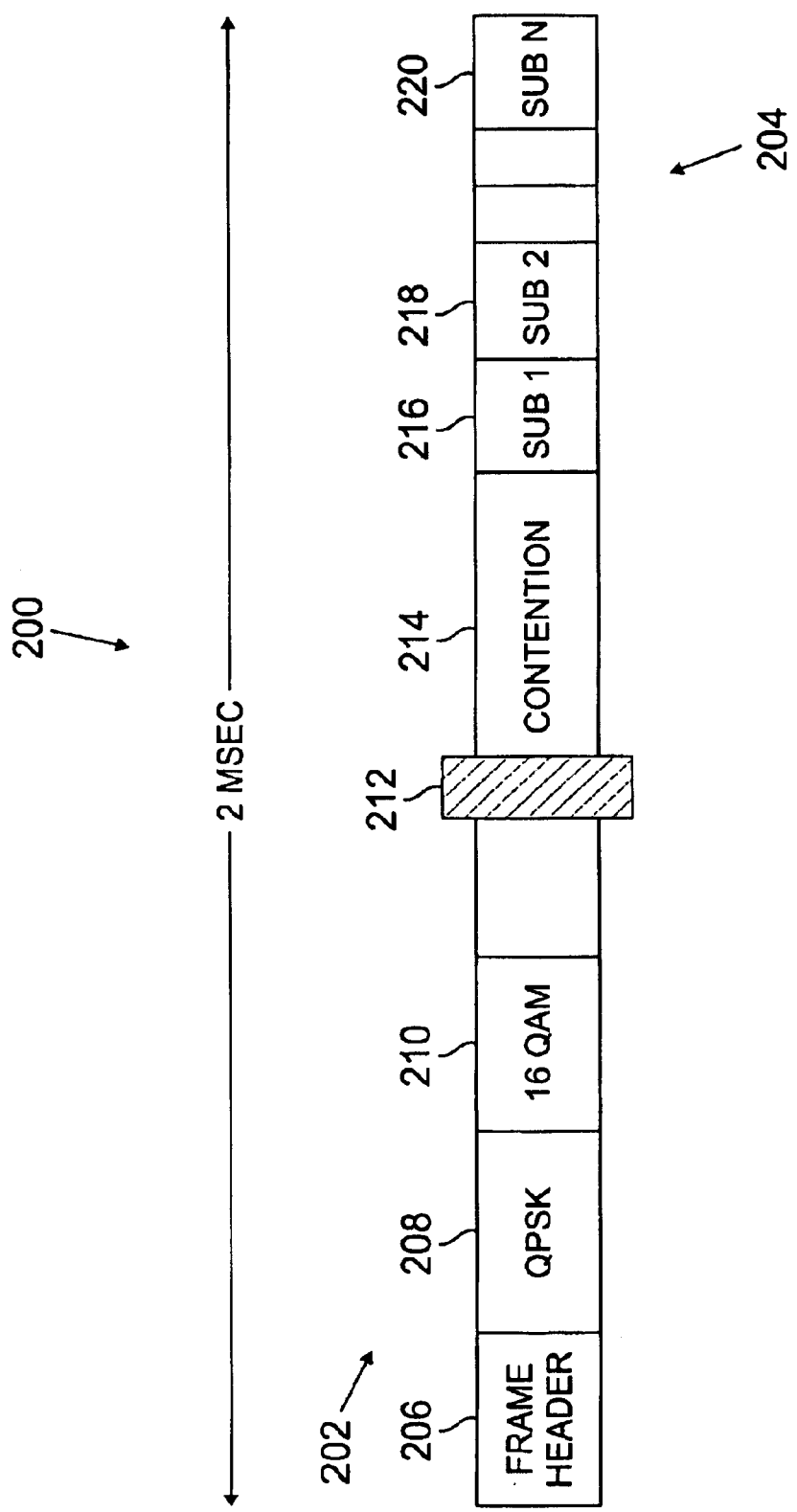
FIG. 2 illustrates an exemplary data frame, as defined by the fixed wireless access network in FIG. 1, according to an embodiment of the present invention.

FIG. 2 illustrates an exemplary data frame as defined by fixed wireless access network 100 according to an embodiment of the present invention. The time division duplex (TDD) data frame 200 is comprised of downlink portion 202 and uplink portion 204 and is propagated along an independent propagation channel, as illustrated in FIG. 1. Downlink portion 202 is comprised of at least frame header 206, modulation segment 208 which signals low complexity modulation, modulation segment 210 which dictates the next highest modulation and contention segment 214. These parameters are managed between both the up link and the down link under control of the basestation RF modem. Boundary 212 is a variable boundary between the uplink and downlink and system monitors and optimize these parameters adaptively and continuously by monitoring the received signal quality optimizing the operating parameters to increase the data throughput. Though only two levels of modulation are indicated in FIG. 2 for ease of explanation, the number of modulations of increasing complexity is arbitrary and may be dictated by the conditions imposed by the system and/or operator.

Unlike the downlink, where each subscriber receives only the base station signal, the base station receives a burst of data on a demand basis from the subscribers on the uplink and the base station has to process each channel. As shown in FIG. 1, the system includes multiple modems connected to access processor 165 for covering the subscribers associated with each base station. Uplink portion 204 of data frame 200 is received by a base station modem and comprises multiple segments: contention period 214 at which access is given to the subscriber stations to communicate the data bursts of uplink data, modulation level, forward Error Correction (FEC) and power level designation from antenna (1) 216, modulation level, forward Error Correction (FEC) and power level designation from antenna (2) 218, and modulation level, forward Error Correction (FEC) and power level designation from antenna (n) 220, where n is the number of antennas transmitting from a subscriber premises.

Figure 3:
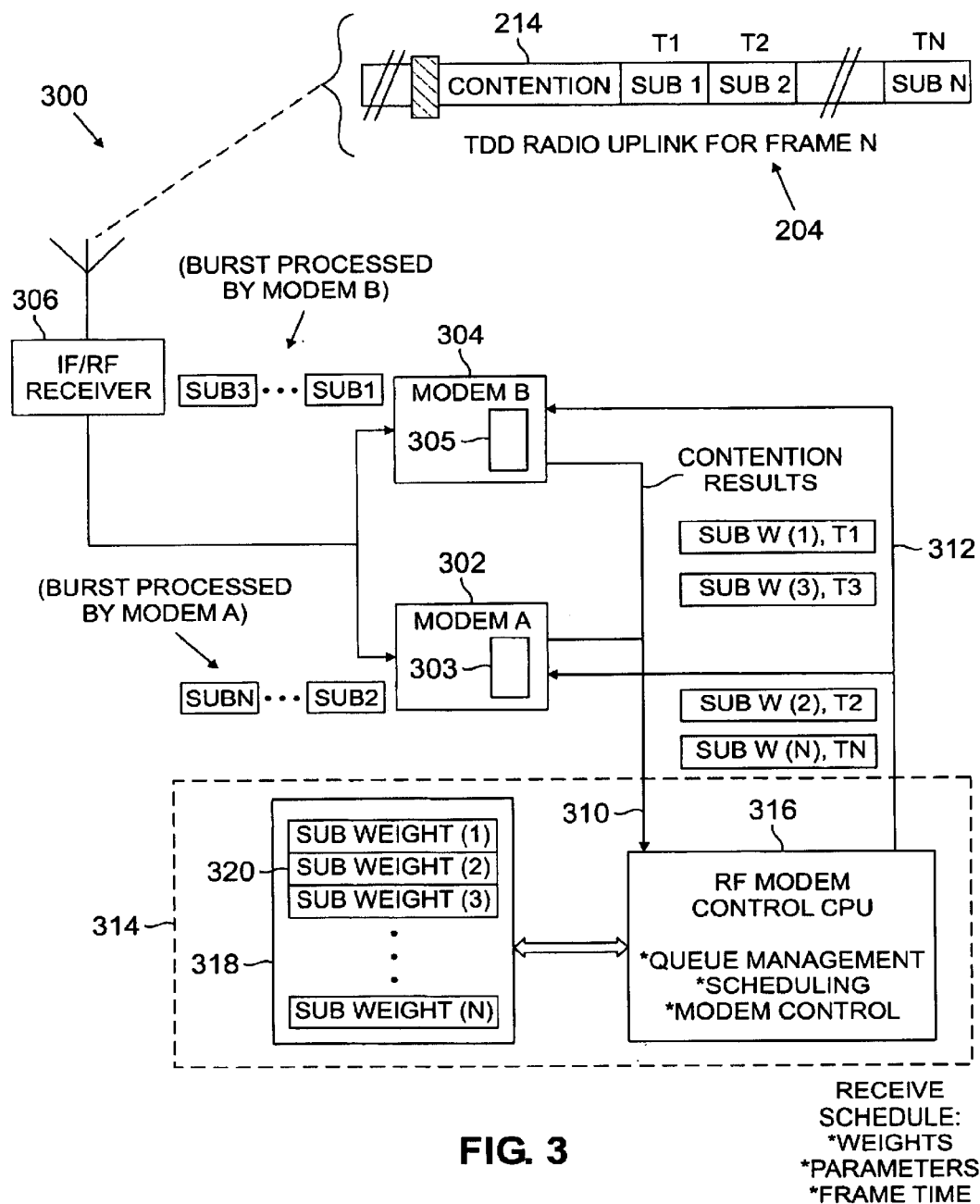
FIG. 3 illustrates a functional block diagram of a portion of an embodiment the present invention comprising two modems and a controller in an embodiment of the present invention.

FIG. 3 illustrates a functional block diagram of a portion of the present invention comprising two modems and a controller in an embodiment of the present invention. Modem 302 and modem 304 are selectively coupled to receive uplink signals sent by different ones of subscriber stations to the base station (not shown). Here, IF/RF (intermediate frequency/radio frequency) receive circuitry 306 of the base station is shown to pass the uplink signals to the modems. Circuitry 306 is operable to down-convert in frequency uplink signals received from receive circuitry 304. Thereafter, the down-converted signals, bursts sub3 . . . sub1 and bursts subN . . . sub2 are operated upon by modems 304 and 302 respectively. The modems are shown to be functionally coupled to controller 316 via lines 310, for receiving contention results, and 312 for passing parameters, frame times and weight values for the modems to apply to the received signals. Controller 314 includes control CPU 316 and memory device 318.

Control CPU 316 is operable, amongst other things, to perform queue management, scheduling operations, as well as to exert control over operation of modems 302 and 304. Profiles (not shown) are created and maintained by controller 314 in a memory such as memory device 318. The profiles include values which represent channel characteristics upon which uplink signals are transmitted as well as characteristics of the uplink signals. The profiles are stored at memory device 318 and are updated as conditions warrant.

Modem 302 includes equalizer 303 which performs equalization functions, and modem 304 includes equalizer 305, also operable to perform equalization functions. The profiles associated with the various communication channels stored at memory device 318 include weighting values 320 by which to weight equalizers 303 and 305. Values 320 are utilized to weight equalizers 303 or 305, as appropriate, when data signals sent to the base station on the corresponding channel are to be operated upon by the selected modem. As channel conditions change, changes to values 318 are calculated and stored. Other values of the profiles, while not separately shown, are analogously stored at memory device 318.

Because changes in the channel condition typically vary at a rate much slower than the rate of data transmission of the uplink data signals, the update rates at which the values of the profiles need to be applied to the modems are a mere fraction of the data transmission rates. For instance, fading rates are typically of a level of approximately 1 to 2 Hz while frame updates of the frames are on the order of approximately 500 Hz. Updates are typically needed at approximately five to ten times the channel rate, i.e. of about 5 to 20 Hz. The updates are common in one implementation are made in conjunction with a status polling mechanism. Additionally, a demand access mechanism permits scheduling of traffic bursts, i.e., bursts of uplink signals that may be anticipated to arrive from a particular subscriber station. A demand access burst within contention period portion 214 of uplink portion 204 of a frame is of a relatively brief duration and utilizes relatively robust FEC and modulation short orthogonalization codes when utilizing a spread spectrum arrangement. The modem at which the burst of the uplink data signal is to be operated cyclically adapts equalization functions performed by the equalizer.

Figure 4:
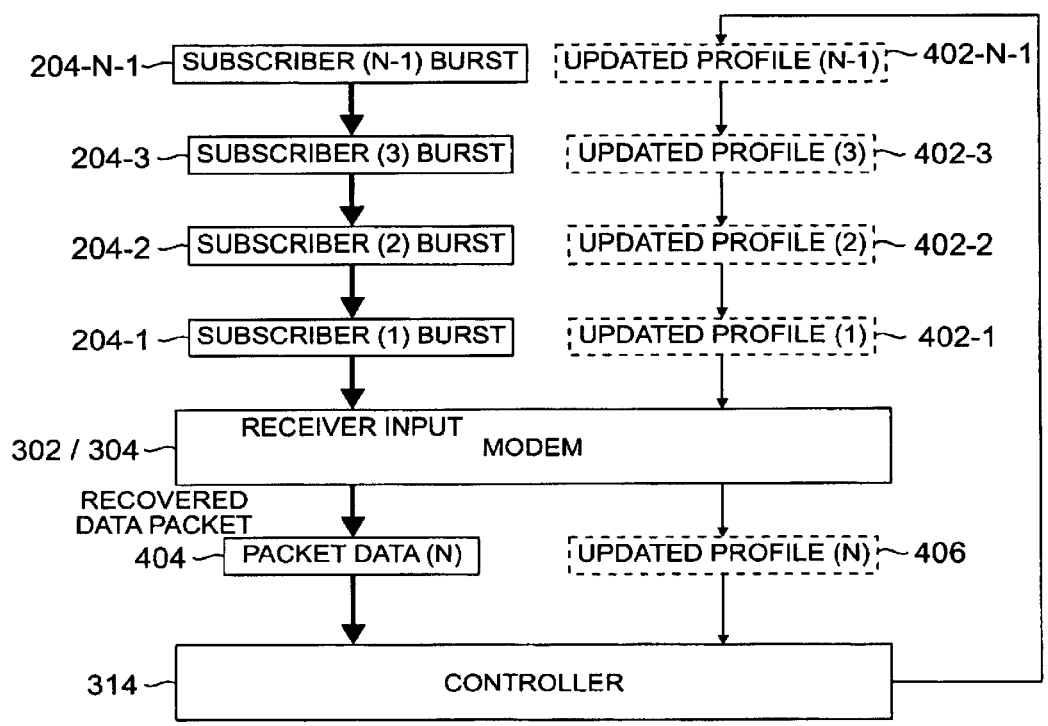
FIG. 4 illustrates a high-level block diagram of the controller and one modem in the base station of FIG. 2 if an embodiment of the present invention.

FIG. 4 illustrates a high-level block diagram of the controller and one modem set in the base station of FIG. 2 in an embodiment of the present invention. Uplink data signal bursts transmitted to the base station by various subscriber stations are represented by the blocks 204-1 through 204-N-1. As a burst of data transmitted by selected subscriber station is applied to modem 302 and 304, a corresponding profile is retrieved from the memory device of the controller and applied to modem 302 or 304. The profiles are represented in the figure by the blocks 402-1 through 402-N-1.

The demodulator portion of modem 302 or 304 operates upon the burst of data received and a resultant packet of data, here represented by the block 404, is generated in which, amongst other things, the values of the data packet have been compensated for the effects of distortion generated thereon.

The controller 314 is here again shown to include the memory device 318 and the control CPU 316. Here, the control CPU is operable to form a profile parameter determiner and updater, and the memory here forms a profile storage device.

Updates are made to the profile as appropriate (indicated by block 406) and the updated profile is stored at the memory device of the controller. When subsequent bursts generated by the same subscriber station are received at the base station and applied to the modem, the updated profile is retrieved and utilized when the subsequent burst of data is to be operated upon by the modem. Compensation for distortion introduced on the uplink data signal is improved because the profile was updated as the data signal's channel conditions changed.

Cyclo-stationary adaptive filtering (CSAF) is performed upon the uplink data burst signal. CSAF is a signal processing technique to allow adaptive filters to operate in environments that exhibit cyclic/deterministic channel environments. Each burst of the data signal transmitted by a subscriber station forms a separate and distinct stationary channel environment. Each of the channels is processed by configuring the receive portion of the base station with a matched filter forming the equalizer, such as equalizers 303 and 305 (shown in FIG. 3) for the specific channel. The values forming the profiles stored at the memory device of the controller are used to weight the equalizer, as appropriate.

Figure 5:
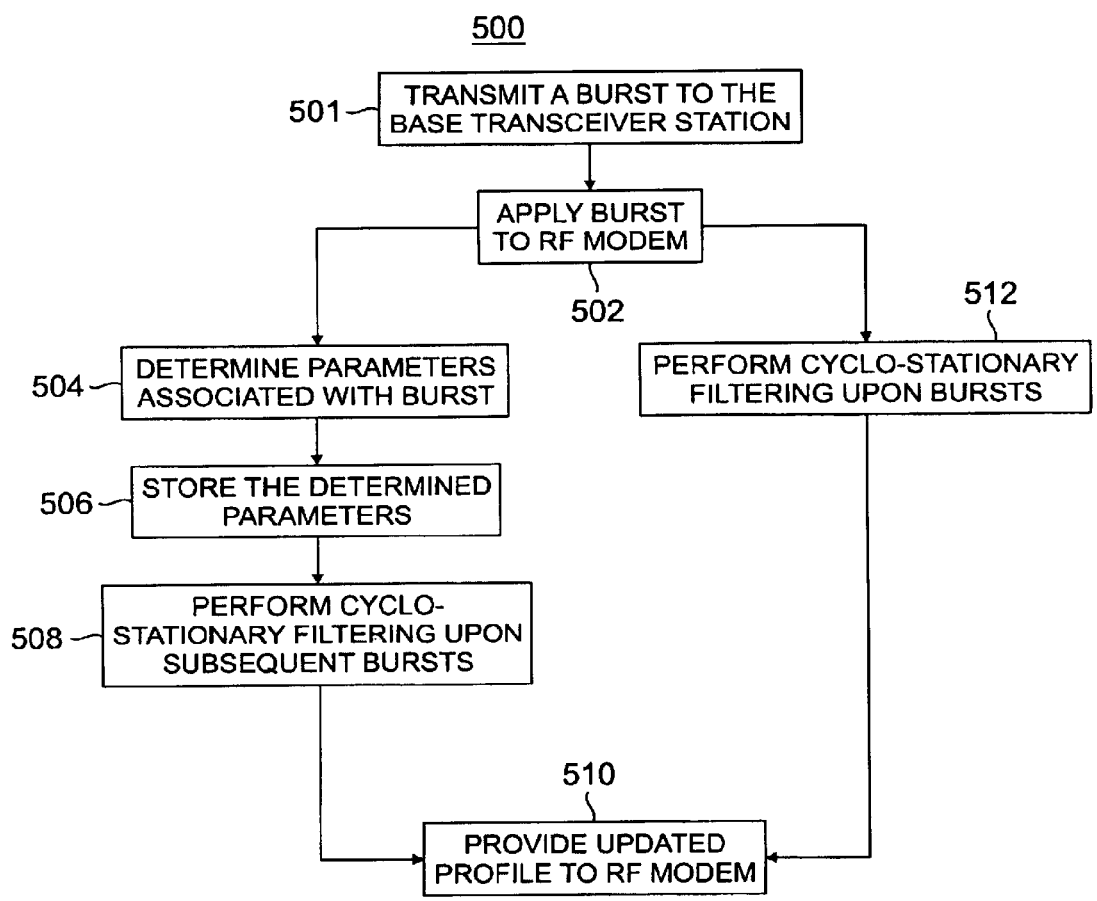
FIG. 5 illustrates a method flow diagram listing the method of operation of embodiment of the present invention by which to create and update a profile used to facilitate receive operations during operation of the fixed wireless access communication system.

FIG. 5 illustrates a method flow diagram, shown generally at 500, of a method by which to create, and update, profiles associated with signal characteristics of burst data signals communicated to a base station and the channel characteristics of the channels upon which the burst data signals are transmitted. By creating, updating, and using the profiles, the speed and accuracy of the operations performed upon the bursts of the burst signal data are improved.

First, and as indicated by the block 501, a subscriber station transmits a burst of a burst data signal to the base station which serves the cell, or the cell sector, in which the subscriber station is positioned. The burst is applied to an RF modem located at the base station, as indicated by the block 502. If the burst is an initial burst communicated during a contention period a path is taken to the block 504 at which operations are performed upon the burst to determine the parameters associated with the burst as well as determinations of the channel characteristics of the channel upon which the burst was transmitted. The parameters include, for instance, signal-related parameters and channel-related parameters. Signal-related parameters include, for instance, the amount of forward error correction (FEC) of the burst, change in frequency of the burst, changes in time of the burst, changes in power levels of the burst, etc. And, channel-related parameters include values of equalization weighting, antenna parameters, either at the subscriber station or at the base station, etc. The calculated parameters are stored, indicated by the block 506, and the stored parameters form the initial profile to be used to perform receive operations upon the burst of the burst of data signal.

Then, and as indicated by the block 508, cyclo-stationary adaptive filtering is performed upon subsequent bursts of the burst of the data signal to update the values of the calculated parameters responsive to calculations performed upon subsequent bursts of the burst data signal during the contention period.

By the end of the contention period, a profile is created, stored in memory, and updated if appropriate. The profile is thereafter provided to an RF modem, indicated at the block 510, to facilitate receive operations performed upon subsequent bursts of the burst data signal during scheduled transmission of the bursts.

Another path extending from the block 502 extends to the block 512 to indicate that during scheduled transmissions of bursts of the burst data signal, additional cyclo-stationary adaptive filtering is performed upon the bursts, also to update the profiles created, and stored in memory.

In an exemplary implementation, two separate modems are utilized to demodulate separate bursts of uplink data signals. By utilizing at least two separate modems, alternating ones of the modems are utilized to demodulate successive bursts of data. During a time period in which a demodulator is not being utilized to operate upon a data burst, values associated with another channel upon which data is expected to be subsequently transmitted is applied to the unused modem. Thereby, when the subsequent burst of data is received at the base station, the modem is immediately operable to operate upon the burst of the uplink data signal.

In another implementation, different types of modems operable upon different types of signals form the separate modems. When a signal generated by a subscriber station is received at the base station, the signal burst is applied to the modem which is capable of operating upon the particular signal. Modem-types are upgradeable while maintaining the backward compatibility of the base station. Additional modems are added, as needed, thereby to permit continued operation of the base station as new types of technology are made available.

In addition to the values associated with weighting of the equalizers, either in the time domain or transformed weights in the frequency domain, additional profile values include, for instance, the modulation index of the uplink data signal, the modulation orthogonalization thereof, parameters associated with forward error correction of the uplink data signal, antenna combining parameters when antenna diversity and/or beamforming is utilized, and residual carrier or baud timing adjustments.

Thereby, through operation of an embodiment of the present invention, a manner is provided by which to operate upon data signals received at a receiving station, such as a base station of a fixed wireless access communication system. The distortion introduced upon the data signals during their communication upon non-ideal communication channels is better compensated for, thereby permitting improved quality of communications as well as increased throughput rates to increase the capacity of the communication system.

The previous descriptions are of preferred examples for implementing the invention, and the scope of the invention should not necessarily be limited by this description. The scope of the present invention is defined by the following claims.

What is claimed is:

1. Profile-creating apparatus for creating at least a first profile associated with transmission upon at least a first channel of at least a first burst-data signal transmitted in bursts to a receiving station, said profile-creating apparatus comprising:

a profile parameter determiner coupled to receive an indication of an initial burst of the first burst data signal transmitted upon the first channel to the receiving station, said profile parameter determiner for determining a value of at least one signal-related parameter and at least one channel-related parameter, wherein the signal-related and channel-related parameters are collectively representative of communication of the first burst data signal over the first channel to the receiving station; and a profile parameter storage device coupled to said profile parameter determiner, said profile parameter storage device for storing values representative of the at least one signal-related parameter and the at least one channel-related parameter determnined by said profile parameter determiner, the values stored at said profile parameter storage device to be used to facilitate receive operations performed at the receiving station on subsequent bursts of the first burst data signal.

2. The apparatus of claim 1 wherein the receiving station is operable in a communication system in which communication protocols include a contention period and wherein the initial burst of the first burst data signal, responsive to which said profile parameter determiner determines the at least one parameter, is communicated during the contention period.

3. The apparatus of claim 1 wherein the channel-related parameter is representative of a channel condition of the first channel.

4. The apparatus of claim 3 wherein the channel-related parameter determined by said profile parameter determiner comprises a value representative of fading exhibited upon the first channel.

5. The apparatus of claim 4 wherein the receiving station comprises an equalizer for performing equalization operations when the at least the first burst data signal and wherein the value representative of fading exhibited when the first channel comprises an equalizer weighting value to be used by the equalizer during the equalization operations.

6. The apparatus of claim 3 wherein the receiving station comprises an antenna assembly and wherein the channel-related parameter determined by said profile parameter determiner comprises an antenna parameter related to the antenna assembly.

7. The apparatus of claim 3 wherein the first burst data signal is transmitted by a first sending station having an antenna assembly and wherein the channel-related parameter determined by said profile parameter determiner comprises an antenna parameter related to the antenna assembly.

8. The apparatus of claim 1 wherein the signal-related parameter is representative of a signal characteristic of the first burst data signal transmitted over the first channel.

9. The apparatus of claim 8 wherein the signal-related parameter determined by said profile parameter determiner comprises a value representative of a frequency characteristic of the first burst data signal.

10. The apparatus of claim 8 wherein the signal-related parameter determined by said profile parameter determiner comprises a value representative of a time-shift characteristic of the first burst data signal.

11. The apparatus of claim 8 wherein the first burst data signal includes forward error correction (FEC) and wherein the signal-related parameter determined by said profile parameter determiner comprises a value representative of the FEC included in the first burst data signal.

12. The apparatus of claim 8 wherein the signal related parameter determined by said profile parameter determiner comprises a value related to power-levels of the first burst data signal.

13. The apparatus of claim 1 wherein said profile parameter determiner is further coupled to receive an indication of at least one additional burst of the first burst data signal, said profile parameter determiner further for determining an updated value of the at least one parameter responsive to the at least one additional burst of the first burst signal.

14. The apparatus of claim 13 wherein the receiving station is operable in a communication system in which communication protocols include a contention period and wherein the initial burst and the at least one additional burst of the first burst data signal, responsive to which said profile parameter determiner determines the at least on parameter is communicated during the contention period.

15. The apparatus of claim 1 wherein at least the first burst data signal transmitted upon the at least the first channel comprises a plurality of burst data signals transmitted upon a plurality of channels and wherein said profile parameter determiner determines a value of a plurality of parameters representative of communication of the plurality of burst data signals and each of the plurality of channels.

16. A method for creating at least a first profile associated with transmission upon at least a first channel of at least a first burst data signal in bursts to a receiving station, said method comprising:

responsive to reception at the receiving station of an initial burst of the first burst data signal transmitted upon the first channel, determining a value of at least one signal-related parameter and at least one channel-related parameter, wherein the signal-related and channel-related parameters are collectively representative of communication of the first burst data signal over the first channel to the receiving station;

storing values representative of the at least one signal-related parameter and the at least one channel-related parameter determined during said operation of determining; and using the values stored during said operation of storing to facilitate receive operations performed at the receiving station upon at least one subsequent burst of the first burst data signal.

17. The method of claim 16 further comprising the operations of:

detecting, at the receiving station, the at least one subsequent burst of the first burst data signal;

responsive to detecting the at least one subsequent burst, updating the previously-determined value(s) of one or both of the at least one signal-related parameter and the at least one channel-related parameter.

18. The method of claim 16 wherein the receiving station is operable in a communication system in which communication protocols include a contention period and wherein the initial burst of the first burst data signal responsive to which the at least one signal-related parameter and the at least one channel-related parameter are determined is transmitted to the receiving station during the contention period.

19. The method of claim 16 wherein the at least channel-related parameter comprises one or more of equalization weighting and antenna parameters.

20. The method of claim 16 wherein the at least signal-related parameter comprises one or more of forward error correction (FEC) amount, frequency change, burst time change, and burst power level change.

* * * * *